United States Patent Office 3,448,076
Patented June 3, 1969

3,448,076
METHOD FOR MAKING CYANOALKYL-SUBSTITUTED ORGANOPOLYSILOXANES
Ben A. Bluestein, Schenectady, N.Y., assignor to General Electric Company, a corporation of New York
No Drawing. Filed Nov. 1, 1967, Ser. No. 679,663
Int. Cl. C08g 47/04, 31/22
U.S. Cl. 260—46.5                    9 Claims

ABSTRACT OF THE DISCLOSURE

A method is provided for making organopolysiloxane polymers having cyanoalkyl radicals attached to silicon by carbon-silicon linkages. Organosilicon materials, such as organocyanoalkylcyclopolysiloxanes, are equilibrated with barium hydroxide, and the resulting cyanoalkyl-substituted organosiloxane polymers are decatalyzed. The decatalyzed cyanoalkyl-substituted organopolysiloxanes which are produced have improved hydrolytic stability, as shown by the ability to resist change resulting from exposure to moisture.

---

The present invention relates to a method for making organopolysiloxane polymers having cyanoalkyl radicals attached to silicon by carbon-silicon linkages. More particularly, the present invention relates to a polymerization method utilizing barium hydroxide as an equilibration catalyst for organosilicon material substituted with cyanoalkyl radicals, and to the treatment of the resulting polymer to decatalyze it.

Prior to the present invention, a method for effecting the rearrangement and polymerization of organosiloxy units, involved the employment of certain equilibration catalysts, such as potassium hydroxide and sulfuric acid. Other acid or basic materials were found to be either less reactive, or undesirable. As a result, prior to the present invention, sulfuric acid or potassium hydroxide were employed for equilibrating organopolysiloxanes including cyanoalkyl-substituted organopolysiloxanes. For example, Prober Patent 3,185,663, shows a method for making cyanoalkylpolysiloxanes utilizing sulfuric acid as an equilibration catalyst to effect the polymerization of lower molecular weight organocyanoalkylcyclopolysiloxanes, such as cyanomethylheptamethylcyclotetrasiloxane. French Patent 1,321,661 shows the equilibration of a mixture of organocyanoalkylsiloxane hydrolyzate with organocyclopolysiloxane, utilizing potassium hydroxide as an equilibration catalyst. Experience has shown that although potassium hydroxide and sulfuric acid are generally effective as equlibration catalysts, these catalyst sometimes go beyond their function of rearranging and polymerizing organosiloxy units by chemically modifying the organo radicals attached to the siloxy units. For example, sulfuric acid sometimes effects cleavage of silicon-carbon bonds while potassium hydroxide can react with the α-hydrogen atoms of the cyanoalkyl-substituted organopolysiloxanes to produce cross-linked polymers. In addition, cyanoalkyl-substituted organopolysiloxanes are generally recognized as being more susceptible to hydrolytic instability due to a higher sensitivity to the effect of residual amounts of equilibration catalysts, as compared to organopolysiloxane free of cyanoalkyl radicals. Attempts to neutralize the effects of residual amounts of highly reactive equilibration catalyst like a sulfuric acid or potassium hydroxide by standard decatalyzing techniques, is shown, for example, by Boot Patent 3,153,007, assigned to the same assignee as the present invention, often are unsuccessful when applied to cyanoalkyl-substituted organopolysiloxanes. Those skilled in the art know that due to the highly reactive nature of sulfuric acid and potassium hydroxide, that even trace amounts of these catalysts can cause serious problems of reversion in cyanoalkyl-substituted organopolysiloxane. Reversion is a depolymerization of the polymer, and can result when the polymer is exposed to moisture or heat. Reversion of organopolysiloxane polymer, particularly cyanoalkyl-substituted organopolysiloxane, can cause the polymer to become tacky, as well as reduce the viscosity of the polymer. In addition, reversion can result in an increase in polymer weight loss when it is heated due to the separation of low molecular weight depolymerization products from the polymer.

The present invention is based on the discovery that cyanoalkyl-substituted organopolysiloxane can be equilibrated readily with barium hydroxide even though this reagent is not reactive enough to equilibrate organopolysiloxane free of cyanoalkyl radicals attached to silicon by carbon-silicon linkages. In addition, once the resulting equilibrated cyanoalkyl-substituted organopolysiloxane is decatalyzed, the polymer is found to have substantially improved thermal and hydrolytic stability.

In accordance with the present invention there is provided a method for making cyanoalkyl-substituted organopolysiloxanes of the formula, (1) 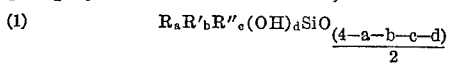

which comprises (1) heating at a temperature in the range of between 50° C. to 250° C., a mixture comprising (A) 100 parts of cyanoalkyl-substituted organosilicon material and (B) $10^{-4}$ parts to 10 parts of barium hydroxide and (2) treating the resulting cyanoalkyl-substituted organopolysiloxane with an effective amount of a barium hydroxide decatalyzing agent, where said cyanoalkyl-substituted organosilicon material of (A) consists essentially of from (a) from 0 to 95 mole percent of chemically combined organosiloxy units selected from organosiloxy units of the formula, (2) 

(b) from 5 to 100 mole percent of chemically combined organocyanoalkylsiloxy units selected from organocyanoalkylsiloxy units of the formula, (3) 

where R is a radical free of aliphatic unsaturation selected from monovalent hydrocarbon radicals and halogenated monovalent hydrocarbon radicals, R' is selected from cyanoalkyl radicals, R" is a member selected from aliphatically unsaturated monovalent hydrocarbon radicals and halogenated aliphatically unsaturated monovalent hydrocarbon radicals, R''' is selected from R and R" radicals, $R^{iv}$ is selected from R''' radicals and cyanoalkyl radicals, a has an average value of from 0 to 2.3 inclusive, b has an average value of from 0.1 to 2.67 inclusive, c has an average value of from 0 to 0.1 inclusive, d has an average value of from 0 to 0.2 inclusive, sum of $a+b+c$ has an average value of from 1.95 to 2.3 inclusive, e is an integer equal to 1 to 3 inclusive, and f is an integer equal to 1 or 2.

Radicals included by R of Formula 1 are aryl radicals and halogenated aryl radicals, such as phenyl, chlorophenyl, xylyl, tolyl, etc.; aralkyl radicals, such as phenylethyl, benzyl, etc.; alkyl radicals such as methyl, ethyl, propyl, chloromethyl, butyl, etc.; cycloalkyl radicals such as cyclohexyl, cycloheptyl, etc. Radicals included by R' of Formula 1 are, for example, cyanoalkyl radicals, such as α-cyanoethyl, β-cyanoethyl, γ-cyanopropyl, δ-cyanobutyl, ω-cyanopentyl, etc. Radicals included by R" are, for example, aliphatically unsaturated hydrocarbon radicals, such as vinyl, allyl, styryl, cyclohexenyl, etc. In Formulas 1, 2 and 3, where R, R', R'', R''' and $R^{iv}$ can be more than one radical, these radicals can be the same or different radicals. Preferably, R is methyl and a mixture of methyl and phenyl where said mixture consists of at least 30 mole percent methyl, R' is β-cyanoethyl and R'' is vinyl.

The barium hydroxide which can be employed in the practice of the invention can be anhydrous, or it can be hydrated with from 1 to 8 molecules of water.

Included by polymers of Formula 1, are a variety of products, such as fluids and gums having viscosities ranging from 10 centipoises or less, to as high as $10^8$ centipoises, or more. For example, fluids can vary from about 10 to about $10^5$ centipoises at 25° C., and preferably consist essentially from 20 to 100 mole percent of organocyanoalkylsiloxy units of Formula 4 chemically combined with from 0 to 80 mole percent of organosiloxy units of Formula 3. Gums can vary between $10^5$ to $10^8$ centipoises at 25° C. and proferably consist essentially of from 25 to 80 mole percent of organocyanoalkylsiloxy units of Formula 4 chemically combined with from 20 to 75 mole percent of organosiloxy units of Formula 3. These fluids and gums can be employed in conventional applications in which cyanoalkylorganopolysiloxanes are utilized. For example, the gums made in accordance with the present invention can be employed to make elastomers having superior resistance to solvent or oil swell, heat-aging and reversion. The fluids made in accordance with the present invention can be utilized in lubricating and hydraulic applications. In addition, solvent resistant greases containing a fluid cyanoalkylorganopolysiloxane and a thickener are also included. Silanol-terminated polymers made in accordance with the invention, also can be employed to make room temperature vulcanizing organopolysiloxane compositions convertible to the solid elastomeric state.

In addition, the method of the present invention also can be employed to equilibrate mixtures of organocyanoalkylsiloxy units of Formula 4, and minor amounts of silarylenesiloxy units, such as

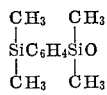

units, where such mixtures can include organosiloxy units of Formula 3. For example, fluids and gums can be made by such method having from 5 to about 30 mole percent of silarylenesiloxy units, based on the total moles of such units, and chemically combined units of Formula 4 and Formula 3 in instances where the latter units are present.

Some of the cyanoalkyl-substituted organopolysiloxanes, which can be employed in the practice of the present invention, consist essentially of units of the formula, (4) $\qquad R_h{}^{iv}R'_{2-h}SiO$ where $h$ is equal to 0 or 1, are shown, for example, by Prober Patent 3,185,663, which is assigned to the same assignee as the present invention. There can be equilibrated, cyanoalkyl-substituted organocyclopolysiloxane of the formula,

where R', $R^{iv}$ and $h$ are as previously defined, and $n$ can be 3 to 8 inclusive. In addition, cocyclics consisting essentially of chemically combined units of Formula 4 and diorganosiloxy units of the formula, (5) $\qquad R_2'''SiO$ where R''' is as previously defined, also can be employed. Accordingly, either of these cyanoalkyl-substituted organocyclopolysiloxanes can be equilibrated alone, or in combination with diorganosiloxane consisting essentially of diorganosiloxy units of Formula 5 such as organocyclopolysiloxane of the formula,

where R''' and $n$ are as defined above.

Where it is desired to make silanol-terminated cyanoalkyl-substituted organopolysiloxanes, polymers of the above described cyanoalkyl-substituted organocyclopolysiloxane, or a mixture of such cyclopolysiloxane, and the above described organocyclopolysiloxane can be equilibrated in the presence of an increment of water to a desired viscosity, as described hereinafter. In instances where either triorganosiloxy chain-stopping siloxy units is desired, or a mixture of such triorganosiloxy chain-stopping units and silanol is desired, organosiloxane can be utilized having chemically combined units of the formula, (6) $\qquad R_3{}^{iv}SiO_{0.5}$ where $R^{iv}$ is as previously defined, in the form of a disiloxane, or a low molecular weight polysiloxane having up to an average of about 20 chemically combined units of Formula 4 or 5, and chain-stopped with units of Formula 6.

In certain situations, it may be expedient to employ a cyanoalkyl-substituted organopolysiloxane in the form of a hydrolyzate obtained by hydrolyzing cyanoalkylhalosilane, shown in Patent 3,185,719—Prober, assigned to the same assignee as the present invention. These cyanoalkyl-substituted organosilicon silanes can be converted to a hydrolyzate by conventional hydrolysis procedures and the resulting hydrolyzate can be equilibrated in accordance with the practice of the present invention either alone or with other organosiloxane free of cyanoalkylsiloxy units, including the above described organocyclopolysiloxane.

As used hereinafter, the term "cyanoalkylsiloxane" will be employed in place of cyanoalkyl-substituted organopolysiloxane, and can signify a mixture consisting essentially of chemically combined units of Formula 2, such as methyl-β-cyanoethylsiloxy units, bis(β-cyanoethyl) siloxy units, etc., in the form of a cyanoalkylsiloxy hydrolyzate or a cyanoalkylcyclopolysiloxane, with cyanoalkylsiloxy chain-stopping units, such as shown by Formula 6, for example, dimethyl-β-cyanoethylsiloxy units, etc., which can be in the form of the corresponding disiloxane, or higher molecular weight siloxane such as the analogous cyanoalkyl-substituted trisiloxane. In addition, cyanoalkylsiloxane can signify cyclic copolymers of organocyanoalkylsiloxy units of Formula 4, chemically combined with diorganosiloxy units of Formula 5 utilized in combination with the aforementioned chain-stopping units.

Cyanoalkylsiloxane also can signify a mixture of the above described cyanoalkylpolysiloxane and organosiloxane consisting essentially of units of Formula 2. For example, a mixture of cyanoalkylpolysiloxane consisting essentially of chemically combined units of Formula 4, for example, 1,3,5,7-tetra(γ-cyanopropyl)-1,3,5,7-tetraphenylcyclotetrasiloxane, can be equilibrated with octamethylcyclotetrasiloxane in the presence of chain-stopping units, such as triorganosiloxy units of Formula 6, where 1 or more of the organo radicals of such triorganosiloxy units can be a cyanoalkyl radical.

In instances where it is desired to make silanol chain-stopped polymers in accordance with the method of the present invention, cyanoalkylsiloxane can signify cyanoalkylpolysiloxane, or mixtures of cyanoalkylpolysiloxane with organosiloxane, which consist of chemically combined units of Formula 4 mixed with chemically combined units of Formula 5, such as a mixture of 1,3,5,7-tetramethyl-1,3,5,7-tetra(β-cyanoethyl)cyclotetrasiloxane and octamethylcyclotetrasiloxane, or cyclic copolymers consisting essentially of chemically combined organocyanoalkylsiloxy units of Formula 4 and diorganosiloxy units of Formula 5.

In the practice of the invention, cyanoalkylsiloxane and barium hydroxide are heated to effect equilibration of the cyanoalkylsiloxane. The resulting product is treated with a barium hydroxide decatalyzing agent.

It is preferred to add the barium hydroxide to the heated cyanoalkylsiloxane while it is being stirred. In some instances, a promoter, such as hexamethylphosphoramide, N-methylpyrrolidone, dimethylsulfoxide, etc., can be used at from 1 to 300 parts of promoter, per part of barium hydroxide. Preferably, there is utilized from $5 \times 10^{-3}$ parts to $5 \times 10^{-1}$ parts of barium hydroxide, per 100 parts of cyanoalkylsiloxane. During the equilibration of the cyanoalkylsiloxane, experience has shown that an inert gas purge, such as a nitrogen purge, can be employed to help remove trace amounts of water. During equilibration, there can be employed a temperature between 50° C. to 250° C., and preferably from 100° C. to 200° C. at atmospheric pressure. Depending upon such factors as degree of agitation, the amount of barium hydroxide, etc., the equilibration of cyanoalkylsiloxane can be accomplished in ½ hour to several hours. In instances where the cyanoalkylsiloxane is a mixture of ingredients, the equilibration mixture generally changes from a heterogeneous mixture to a homogeneous polymer.

At the termination of the equilibration, the barium hydroxide can be deactivated by standard methods normally employed for decatalyzing potassium hydroxide. For example, there can be employed stoichiometric amounts of phosphoric acid, triethylphosphate, iodine, tribromopropane, etc., such as shown by Boot Patent 3,153,007, Grubb Patent 2,789,109, Linville Patent 2,739,952, etc., assigned to the same assignee as the present invention. Preferably the polymer is decatalyzed with carbon dioxide. In instances where it is desired to make cyanoalkylpolysiloxane polymers chain-stopped with silanol radicals, or a mixture of silanol radicals and organosiloxy units of Formula 6, it has been found expedient to add minor amounts of water to the equilibrated polymer before decatalyzing. A proportion of up to 0.1 mole of water, per mole of organosiloxy units selected from Formula 4, a mixture of 4 and 5, or 4, 5 and 6, will provide for effective results. The equilibrated polymer can be allowed to cool sufficiently to permit the addition of the amount of water desired. The mixture can be heated at a temperature in the range between 25° C. to 150° C. and agitated until the viscosity of the resulting silanol-containing polymer is uniform and constant. The silanol-containing polymer then can be decatalyzed.

In instances where carbon dioxide is employed to decatalyze, sufficient carbon dioxide should be employed to provide for effective contact between at least one mole of carbon dioxide, per mole of barium hydroxide employed in the equilibration mixture. During the carbon dioxide purge, temperatures between room temperature to 200° C. can be employed. Solid carbon dioxide, Dry-Ice refrigerant, also can be employed if it can be intimately contacted with polymer. However, due to the fact that effective penetration of the polymer with carbon dioxide may be difficult to achieve to completely deactivate the polymer it is preferred to employ large excesses of carbon dioxide. A large excess of carbon dioxide, such as 10 to 100 molar excesses or higher, can be employed if desired without adverse results.

The cyanoalkylpolysiloxane polymers made in accordance with the practice of the present invention can be employed to make solvent resistant organopolysiloxane elastomers by incorporating fillers such as silica fillers, etc., and vulcanizing agents, such as peroxides, etc. Depending upon the molecular weight and the nature of the terminal radical of the polymer, heat curable or room temperature vulcanizing compositions can be made by standard procedures.

In order that those skilled in the art will be better able to practice the invention, the following examples are given by way of illustration and not by way of limitation. All parts are by weight.

Example 1

There is added 0.1 part of barium hydroxide octahydrate to a mixture at a temperature of 140° C., of 226 parts of a mixed methyl-β-cyanoethylcyclopolysiloxane, consisting essentially of chemically combined methyl-β-cyanoethylsiloxy units, 148 parts of octamethylcyclotetrasiloxane, 0.58 part of 1,3,5,7-tetramethyl - 1,3,5,7 - tetravinylcyclotetrasiloxane, and 0.04 part of decamethyltetrasiloxane. The resulting mixture is stirred at a bath temperature between 190° C. and 200° C. while being purged with nitrogen. After stirring the mixture for about 3 hours at a temperature of about 200° C., the mixture changes from a viscous heterogeneous state to a clear very viscous, single phase system. Carbon dioxide, at a flow rate of about five liters per minute per part of barium hydroxide is passed over the surface of the resulting equilibrated product for two hours. After the carbon dioxide treatment, there is obtained a dry, firm, transparent polymer. Based on its method of preparation, the polymer is a methyl-β-cyanoethylpolysiloxane of the average formula,

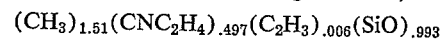
$$(CH_3)_{1.51}(CNC_2H_4)_{.497}(C_2H_3)_{.006}(SiO)_{.993}$$

The above procedure is repeated, except that there is employed in place of barium hydroxide, 8 parts of KOH, per million of mixture. In addition, instead of decatalyzing the resulting polymer with carbon dioxide, it is decatalyzed with a stoichiometric amount of phosphoric acid. There is also obtained a dry, firm, methyl-β-cyanoethylpolysiloxane polymer, based on method of preparation.

Equivalent samples of the polymers made by the barium hydroxide method of the present invention, and the potassium hydroxide method of the prior art, are placed in open containers and allowed to remain under atmospheric conditions. After thirty days, both samples are examined. The polymer made in accordance with the present invention remains unchanged. The polymer made by the prior art method is found to be tacky and substantially depolymerized.

Example 2

A mixture of 20 parts of β-cyanoethylcyclopolysiloxane consisting essentially of chemically combined methyl-β-cyanoethylsiloxy units and 19.7 parts of octamethylcyclotetrasiloxane is heated to 110° C. While the mixture is stirring, there is added 0.01 part of anhydrous barium hydroxide. The mixture is then heated to reflux at a temperature of about 175° C. The heating of the mixture is continued until the mixture becomes uniform. After an additional two hours of stirring and heating, the mixture is allowed to cool to 100° C. There is then added 0.03 part of distilled water, while stirring the mixture. This mixture is heated and stirred for about 3 hours. The mixture is then purged for one and one-half hours at 100° C. with carbon dioxide, at a flow rate of about five liters of carbon dioxide, per part of barium hydroxide. The batch is then allowed to cool. Based on method of preparation, there is obtained a silanol-terminated β-cyanoethylpolysiloxane consisting essentially of about 60 mole percent of dimethylsiloxy units chemically combined with about 40 mole percent of methyl-β-cyanoethylsiloxy units having the average formula,

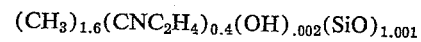
$$(CH_3)_{1.6}(CNC_2H_4)_{0.4}(OH)_{.002}(SiO)_{1.001}$$

Example 3

There is added 0.02 part of barium hydroxide octahydrate to a mixture at a temperature of about 180° C., of 113 parts of methyl-β-cyanoethylcyclopolysiloxane consisting essentially of chemically combined methyl-β-cyanoethylsiloxy units, 74 parts of octamethylcyclotetrasiloxane, 0.3 part of 1,3,5,7-tetramethyl-1,3,5,7-tetravinylcyclotetrasiloxane and 1 part of hexamethylphosphoramide. The resulting mixture is stirred constantly for 6 hours while maintaining the temperature at about 180° C. There is then added to the mixture, 2 parts of tribromopropane and the mixture is stirred for an additional two hours at 180° C. The mixture is then allowed to cool. A dry soft gum is obtained having an intrinsic viscosity ($\eta$) of 0.9 dl./g. in ethyl acetate at 25° C. Based on method of preparation the polymer has the average formula, $$(CH_3)_{1.5}(CNC_2H_4)_{0.5}SiO$$

The above procedure is repeated, except that in place of tribromopropane, there is employed carbon dioxide at a flow rate of about five liters per minute, per part of barium hydroxide over a period of about two hours. A dry soft polymer also is obtained.

The above procedure is again repeated except that there is employed 10 parts of potassium hydroxide, per million parts of mixture which is heated for 5 hours at 130° C. The resulting product is then decatalyzed at a temperature of about 130° C. with carbon dioxide at a flow rate of about fifty liters per minute, per part of potassium hydroxide for 3 hours. This equilibration mixture also is decatalyzed with a stoichiometric amount of tribromopropane, in accordance with the prior art. The table below shows the results obtained with the various polymers made by the method of the present invention as compared to the method of the prior art after exposure in the atmosphere for 4 days at 25° C.

| Equilibration catalyst | Catalyst deactivator | 4 days (25° C.) in atmosphere |
|---|---|---|
| BaOH | CO₂ | Dry and firm. |
| BaOH | Tribromopropane | Do. |
| KOH | CO₂ | Tacky. |
| KOH | Tribromopropane | Do. |

The above results show that the equilibration of the methyl-β-cyanoethylsiloxane utilizing barium hydroxide results in a gum that is less susceptible to the effects of reversion, as compared to a gum which is equilibrated with potassium hydroxide.

Example 4

A mixture of 20 parts of β-cyanoethylcyclopolysiloxane consisting essentially of chemically combined methyl-β-cyanoethylsiloxy units, 19.7 parts of octamethylcyclotetrasiloxane, and 4 parts of a trimethylsiloxymethyl-β-cyanoethylsiloxane fluid having about 10 mole percent of chemically combined trimethylsiloxy units is heated to 110° C. While the mixture is stirring, there is added 0.01 part of anhydrous barium hydroxide. The mixture is then heated to reflux at a temperature of about 175° C. The heating of the mixture is continued until the mixture becomes uniform. After an additional two hours of stirring and heating the mixture, it is allowed to cool to 100° C. There is then added while stirring the mixture, 0.03 part of distilled water. The mixture is then heated and stirred for an additional 3 hours. The mixture is then purged for 1½ hours at 100° C. with carbon dioxide at a flow rate of about five liters of carbon dioxide per minute, per part of barium hydroxide. The batch is then allowed to cool. Based on method of preparation, there is obtained a β-cyanoethylpolysiloxane consisting essentially of about 60 mole percent of dimethylsiloxy units chemically combined with about 40 mole percent of methyl-β-cyanoethylsiloxy units and terminated with a mixture of silanol radicals and trimethylsiloxy radicals.

Example 5

There is added 0.1 part of barium hydroxide octahydrate to a mixture at a temperature of about 120° C. of 226 parts of mixed methyl-β-cyanoethylcyclopolysiloxane consisting essentially of chemically combined methyl-β-cyanoethylsiloxy units, 74 parts of octamethylcyclotetrasiloxane, 198 parts of octaphenylcyclotetrasiloxane, 0.58 part of 1,3,5,7-tetramethyl-1,3,5,7-tetravinylcyclotetrasiloxane, and 0.05 part of decamethyltetrasiloxane. The resulting mixture is stirred at a bath temperature between 190° C. and 200° C. while being purged with nitrogen. After stirring the mixture for about 3 hours at a temperature of about 200° C., the mixture changes from a viscous heterogeneous state to a clear very viscous single phase system. Carbon dioxide at a flow rate of about five liters per minute, per part of barium hydroxide, is passed over the surface of the resulting equilibrated product for 2 hours. After the carbon dioxide treatment, there is obtained a dry firm transparent polymer. Based on its method of preparation, the polymer is a β-cyanoethylpolysiloxane consisting essentially of 24.9 mole percent of chemically combined diphenylsiloxy units, 24.9 mole percent of dimethylsiloxy units, 49.7 mole percent of methyl-β-cyanoethylsiloxy units and 0.6 mole percent of chemically combined methylvinylsiloxy units and chain-stopped with trimethylsiloxy units.

Example 6

There is mixed with 100 parts of a methyl-γ-cyanopropylcyclopolysiloxane consisting essentially of chemically combined dimethylsiloxy units and methyl-γ-cyanopropylsiloxy units made in accordance with the method of Cahoy et al., Journal of Organic Chemistry, vol. 26, June 191, page 2009 to 2012, 0.1 part of barium hydroxide octahydrate and heated at 130° C. for 3 hours. There is obtained a viscous firm gum which, after treatment with carbon dioxide in accordance with the procedure of Example 5, remains tack free after exposure to atmospheric conditions for 30 days at 25° C. Based on method of preparation the polymer is composed of chemically combined dimethylsiloxy units and methyl-γ-cyanopropylsiloxy units.

Example 7

There is added 0.2 part of barium hydroxide octahydrate to a stirred mixture at 190° C. of 452 parts of methyl - β-cyanoethylcyclopolysiloxane consisting essentially of chemically combined methyl-β-cyanoethylsiloxy units, 74 parts of octamethylcyclotetrasiloxane, and 0.02 part of decamethyltetrasiloxane. After the mixture is heated for 5 hours, a clear viscous polymer is obtained which is exposed to carbon dioxide for 4 hours at a flow rate of about five liters per minute per part of barium hydroxide. There is obtained a soft gum upon cooling to room temperature. The gum remains tack free after exposure to the atmosphere for 30 days at 25° C. Based on method of preparation the gum has the following average formula, $$(CH_3)_{1.21}(CNC_2H_4)_{0.8}(SiO)_{.995}$$

Example 8

A mixture of 226 parts of a methyl-β-cyanoethylcyclopolysiloxane consisting essentially of chemically combined methyl-β-cyanoethylsiloxy units, 445 parts of octamethylcyclotetrasiloxane, and 5 parts of a trimethylsiloxy chain-stopped methyl-β-cyanoethylsiloxy fluid having about 10 mole percent of chemically combined trimethylsiloxy units is heated with 0.2 part of barium hydroxide octahydrate for 12 hours at a bath temperature of about 195° C. The mixture is then allowed to cool to 100° C. and it is equilibrated with 0.03 part of water for 8 hours. The resulting mixture is then treated with a carbon dioxide at a flow rate of about five liters of carbon dioxide per minute, per part of barium hydroxide for about 2 hours. The mixture is then allowed to cool to room temperature. There is obtained a clear fluid having a viscosity of about 848,000 centipoises at 25° C. Based on method of preparation the fluid is a silanol-terminated methyl-β-cyanoethylpolysiloxane having the average formula, $$(CH_3)_{1.75}(CNC_2H_4)_{0.25}(SiO)_{1.005}$$

Example 9

A mixture of about 90 parts of methyl-β-cyanoethylcyclosiloxane consisting essentially of chemically combined methyl-β-cyanoethylsiloxy units, and about 10 parts of a methyl-β-cyanoethylsiloxane consisting essentially of about 90 mole percent of methyl-β-cyanoethylsiloxy units chemically combined with about 10 mole percent of trimethylsiloxy units and .05 part of anhydrous barium hydroxide is heated for 3 hours at a temperature of about 175° C. Carbon dioxide is then bubbled into the mixture for 2 hours while the mixture is vigorously agitated, utilizing a flow rate of about five liters per minute of carbon dioxide, per part of barium hydroxide. The mixture is then allowed to cool to room temperature. There is obtained a polymer having a viscosity of about 30,000 centipoises at 25° C. Based on method of preparation the polymer consisted essentially of about 99 mole percent of methyl-β-cyanoethylsiloxy units, chemically combined with about 1 mole percent of trimethylsiloxy units. It has the average formula, $$(CH_3)_{1.02}(CNC_2H_4)_{.99}(SiO)_{.995}$$

The same procedure is repeated, except that in place of the anhydrous barium hydroxide, there is employed about 8 parts of potassium hydroxide, per million parts of mixture. The polymer is decatalyzed with 0.1 part of 1,2,3-tribromopropane, in accordance with the teaching of Boot Patent 3,153,007. There is obtained a methyl-β-cyanoethylpolysiloxane having about the same viscosity as shown above.

Both fluid methyl-β-cyanoethylpolysiloxanes are allowed to rest under atmospheric conditions for about six months. The fluid made in accordance with the present invention remains substantially unchanged. The fluid polymerized with KOH and decatalyzed with 1,2,3-tribromopropane reverts to a lower viscosity fluid, as compared to its original viscosity.

While the foregoing examples have of necessity been limited to only a few of the very many variables within the scope of the present invention, it should be understood that the present invention includes a method for making a much broader class of polymers shown by Formula 1 consisting essentially of chemically combined units selected from organosiloxy units of Formulas 2 and 3. These polymers also can include chemically combined silarylenesiloxy units. For example, the method of the present invention provides for the production of a wide variety of fluids and gums which can consist essentially of chemically combined units of Formula 4 along with chemically combined units of Formula 5. In addition, the method of the present invention also includes much broader class of barium hydroxide deactivating agents, in addition to those specifically illustrated in the above examples.

What I claim as new and desire to secure by Letters Patent of the United States is:

1. A method for making cyanoalkyl-substituted organopolysiloxanes of the formula, $$R_aR'_bR''_c(OH)_dSiO_{\frac{(4-a-b-c-d)}{2}}$$

which comprises (1) heating at a temperature in the range of between 50° C. to 250° C., a mixture comprising by weight (A) 100 parts of cyanoalkyl-substituted organosilicon material and (B) $10^{-4}$ part to 10 parts of barium hydroxide and (2) deactivating the resulting cyanoalkyl-substituted organopolysiloxane with an effective amount of a member selected from the class consisting of carbon dioxide, and a decatalyzing agent suitable for deactivating potassium hydroxide in organopolysiloxanes, where said cyanoalkyl-substituted organosilicon material of (A) consists essentially of from (a) from 0 to 95 mole percent of chemically combined organosiloxy units selected from organosiloxy units of the formula, $$R'''_e SiO_{\frac{(4-e)}{2}}$$

and (b) from 5 to 100 mole percent of chemically combined organocyanoalkylsiloxy units selected from organocyanoalkylsiloxy units of the formula, $$R_f^{iv}R'SiO_{\frac{(3-f)}{2}}$$

where R is a radical free of aliphatic unsaturation selected from the class consisting of monovalent hydrocarbon radicals and halogenated monovalent hydrocarbon radicals, R' is selected from cyanoalkyl radicals, R'' is a member selected from the class consisting of aliphatically unsaturated monovalent hydrocarbon radicals and halogenated aliphatically unsaturated monovalent hydrocarbon radicals, R''' is selected from the class consisting of R radicals and R'' radicals, $R^{iv}$ is selected from the class consisting of R' radicals and R''' radicals, $a$ has an average value of from 0 to 2.3, inclusive, $b$ has an average value of from 0.1 to 2.67, inclusive, $c$ has an average value of from 0 to 0.1, inclusive, $d$ has an average value of from 0 to 0.2, inclusive, sum of $a+b+c$ has and average value of from 1.95 to 2.3, inclusive, $e$ is an integer equal to 1 to 3, inclusive, and $f$ is an integer equal to 1 or 2.

2. A method in accordance with claim 1, where the barium hydroxide decatalyzing agent is carbon dioxide.

3. A method for making a cyanoalkyl-substituted organopolysiloxane having terminal silanol in accordance with claim 1, where the resulting cyanoalkyl-substituted organopolysiloxane of (1), is allowed to cool to a temperature between 25° C. to 150° C., and there is added thereto, up to 0.1 mole of water, per mole of chemically combined siloxane, prior to treating said cyanoalkyl-substituted organopolysiloxane with an effective amount of a barium hydroxide decatalyzing agent.

4. A method in accordance with claim 3, where the silanol-containing cyanoalkyl-substituted organopolysiloxane consists essentially of from 20 to 100 mole percent of methyl-β-cyanoethylsiloxy units, chemically combined with from 0 to 80 mole percent of organosiloxy units selected from the class consisting of:

(a) dimethylsiloxy units, and (b) a mixture of (a), and diphenylsiloxy units, where
  (b) can have a total of at least 30 mole percent of methyl radicals of (a), based on the total moles of methyl and phenyl radicals.

5. A method in accordance with claim 3, where the silanol-containing cyanoalkyl-substituted organopolysiloxane is terminated with a mixture of silanol radicals and radicals of the formula, $$R_3^{iv}SiO_{0.5}$$

where $R^{iv}$ is as previously defined.

6. A method in accordance with claim 1, where the cyanoalkyl-substituted organopolysiloxane is a gum which consists essentially of from 25 to 80 mole percent of methyl-β-cyanoethylsiloxy units chemically combined with from 20 to 75 mole percent of organosiloxy units selected from the class consisting of (a) dimethylsiloxy units, and (b) a mixture of (a) and diphenylsiloxy units, where
  (b) can have at least 30 mole percent of methyl radicals, based on the total moles of methyl and phenyl radicals.

7. A method in accordance with claim 1, where the cyanoalkyl-substituted organopolysiloxane consists essentially of chemically combined methyl-β-cyanoethylsiloxy units and chain-stopped with trimethylsiloxy units.

8. A method in accordance with claim 1, where the cyanoalkyl-substituted organosilicon material is heptamethyl-β-cyanoethylcyclotrisiloxane.

9. A method in accordance with claim 1, where there is employed from $5 \times 10^{-3}$ to $5 \times 10^{-1}$ part of barium hydroxide per 100 parts of said cyanoalkyl-substituted organosilicon material.

References Cited

UNITED STATES PATENTS 3,227,579  1/1966  Bluestein _____ 260—46.5

DONALD E. CZAJA, *Primary Examiner.*

M. I. MARQUIS, *Assistant Examiner.*

U.S. Cl. X.R.

260—37, 448.2